US 9,952,116 B2

(12) United States Patent
Fowler

(10) Patent No.: US 9,952,116 B2
(45) Date of Patent: Apr. 24, 2018

(54) APPARATUS FOR DRIVING A ROTOR

(71) Applicant: Universal Balancing Limited, Kingswood Bristol (GB)

(72) Inventor: Steve Fowler, Kingswood Bristol (GB)

(73) Assignee: Universal Balancing Limited, Kingwood Bristol (GB)

( * ) Notice: Subject to any disclaimer, the term of this patent is extended or adjusted under 35 U.S.C. 154(b) by 124 days.

(21) Appl. No.: 14/889,957

(22) PCT Filed: May 7, 2014

(86) PCT No.: PCT/GB2014/051393
§ 371 (c)(1),
(2) Date: Nov. 9, 2015

(87) PCT Pub. No.: WO2014/181103
PCT Pub. Date: Nov. 13, 2014

(65) Prior Publication Data
US 2016/0146693 A1    May 26, 2016

(30) Foreign Application Priority Data
May 10, 2013    (GB) .................................... 1308426.4

(51) Int. Cl.
*G01M 1/16*    (2006.01)
*G01M 1/32*    (2006.01)
(Continued)

(52) U.S. Cl.
CPC ............. *G01M 1/32* (2013.01); *F16D 1/101* (2013.01); *F16D 3/50* (2013.01); *G01M 1/04* (2013.01);
(Continued)

(58) Field of Classification Search
CPC .......... G01M 1/04; G01M 1/32; F16D 1/101; F16D 3/50
(Continued)

(56) References Cited

U.S. PATENT DOCUMENTS 1,262,999 A * 4/1918 Swift et al. ............. G01M 1/32
73/468
1,739,105 A * 12/1929 Trumpler ................ G01M 1/04
73/455
(Continued)

FOREIGN PATENT DOCUMENTS

DE    8701379 U1    6/1988
JP    2873448 B1    3/1999
JP    2001300803 A    10/2001

OTHER PUBLICATIONS

GB1308426.4 Search Report dated Nov. 8, 2013, 1 page.

*Primary Examiner* — Lisa Caputo
*Assistant Examiner* — Roger Hernandez-Prewitt
(74) *Attorney, Agent, or Firm* — Boyle Fredrickson, S.C.

(57) ABSTRACT

A mounting apparatus for a rotor, including: a first portion for connection to a driving means, for rotation about a first rotational axis; a second portion comprising a mounting assembly adapted for engaging with a portion of the rotor so as to hold the rotor relative thereto, configured for rotation about a second rotational axis; and a connection member connecting the first portion to the second portion so that rotational movement of the first portion effects rotational movement of the second portion about the second rotational axis, wherein the connection member is configured substantially to prevent radial movement of the second portion relative to the first portion, while enabling inclination of the first rotational axis relative to the second rotational axis.

16 Claims, 8 Drawing Sheets

(51) Int. Cl.
*G01M 1/04* (2006.01)
*H02K 7/00* (2006.01)
*H02K 7/04* (2006.01)
*F16D 1/10* (2006.01)
*F16D 3/50* (2006.01)

(52) U.S. Cl.
CPC ............... *H02K 7/003* (2013.01); *H02K 7/04* (2013.01); *F16D 2001/103* (2013.01)

(58) Field of Classification Search
USPC .................................................. 73/468, 460
See application file for complete search history.

(56) References Cited

U.S. PATENT DOCUMENTS

| | | | |
|---|---|---|---|
| 2,832,601 A | | 4/1958 | Mann |
| 3,154,973 A | * | 11/1964 | Hack ........................ G01M 1/04 408/2 |
| 3,172,303 A | * | 3/1965 | Völler et al. .......... B24B 41/042 451/343 |
| 4,074,946 A | * | 2/1978 | Swearingen .......... F04D 29/266 192/69.8 |
| 5,022,276 A | | 6/1991 | Thelen |
| 2008/0289416 A1 | | 11/2008 | Thelen |

* cited by examiner

APPARATUS FOR DRIVING A ROTOR

The present invention relates to an apparatus for driving a rotor such as a propshaft. In particular, but not exclusively, the invention relates to an apparatus for driving a rotor which does not have any articulated connections, e.g. universal joints or the like, at its opposite ends.

Propshafts, and more generally rotors, can be formed of a single rotor portion or multiple rotor portions linked together in end-to-end alignment. Rotors formed of multiple rotor portions may comprise two or three such portions, and less commonly may comprise four portions.

Balancing is typically carried out on rotors to overcome or lessen the problem of 'unbalance'—the uneven distribution of mass around the axis of rotation of the rotor. Unbalance is when the inertia axis of the rotor is offset from its central axis of rotation, which results from the mass of the rotor not being distributed uniformly about its central axis. Rotors suffering unbalance may generate a moment when rotating which leads to vibration.

It is known to balance a single piece rotor using two balance planes. Each balance plane is a plane disposed substantially perpendicular to the axis of the rotor. When balancing a multiple piece rotor, balancing is carried out in additional balance planes: a two piece rotor may be balanced in three planes, a three piece rotor may be balanced in four planes, and a four piece rotor may be balanced in five planes.

Correction for unbalance is typically carried out by welding balance weights to the rotor. Rotors are designed with zones where balance weights can be added corresponding to the number of balancing planes, which are usually near the end of each rotor portion.

The mechanism for correcting unbalance is typically automated, by which balance weights are attached (e.g. welded) to the rotor at a set position along the axis of the rotor for each plane, within specified balance zones. Once weights for all planes (where required) are applied to the rotor, the rotor unbalance is measured again using the same method. If the unbalance measured in any plane remains outside of a predefined tolerance threshold, a second step of correction is carried out within the corresponding balance zone.

To perform the balancing process a rotor is loaded into a balancing machine that includes an apparatus for driving the rotor. Each end of the rotor is located in a respective mounting apparatus that includes a chuck to secure that end of the rotor. The mounting apparatuses are driven by a drive mechanism so as to transfer torque to the rotor. In order to measure unbalance in the rotor as it rotates, the rotor must be allowed some degree of movement within the balancing machine—if the rotor is not permitted to flex then any unbalance in the rotor cannot be detected efficiently (if at all). Known balancing machines attempt to address this issue by providing a degree of clearance at each chuck, to enable slight radial movement of the rotor relative to the chuck. However, this causes balance repeatability issues, as the radial movement of the ends of the rotor cannot be measured accurately, and therefore is not taken into account during the unbalance testing. An alternative approach is to allow a degree of articulation by providing a ball joint between the chuck and the drive mechanism. However, such configurations do not allow for any degree of axial movement of the rotor relative to the chuck unless there is clearance between the rotor and the chuck, i.e. a slip fit, and therefore the natural flexing of the rotor cannot be achieved. This limits the accuracy to which unbalance can be measured.

According to an aspect of the invention we provide a mounting apparatus for a rotor, including: a first portion for connection to a driving means, for rotation about a first rotational axis; a second portion comprising a mounting assembly adapted for engaging with a portion of the rotor so as to hold the rotor relative thereto, configured for rotation about a second rotational axis; and a connection member connecting the first portion to the second portion so that rotational movement of the first portion effects rotational movement of the second portion about the second rotational axis, wherein the connection member is configured substantially to prevent radial movement of the second portion relative to the first portion, while enabling inclination of the first rotational axis relative to the second rotational axis.

Further features of this aspect of the invention are described in the appended claims.

Embodiments of the invention will now be described, by way of example only, with reference to the following figures, of which:

Figure 1:
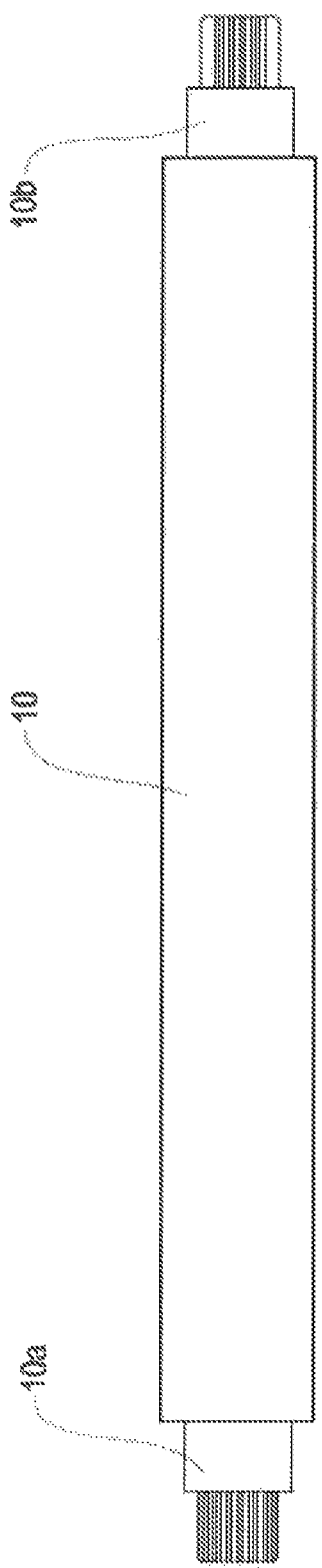
FIG. 1 is a diagrammatic view of a rotor supported in an apparatus for driving a rotor, according to embodiments of the invention.

FIG. 1 shows a rotor 10, which when balanced would be supported in a balancing machine (not shown). The rotor may be of any suitable type, as is commonly known in the field, such as propshafts including driveshafts and Cardan shafts, for example. However, the present invention has been devised primarily for use with single-piece rotors—i.e. rotors without any articulated connections, e.g. universal joints or the like, at its opposite ends. In the present example the rotor has splined ends 10a, 10b.

Such a balancing machine 1 comprises an apparatus 2 for driving the rotor 10, which includes a first mounting apparatus and a second mounting apparatus for mounting the rotor 10 by supporting opposite ends of the rotor 10. The balancing machine 1 is operable to rotate the rotor 10 about its axis to a specified speed of rotation, by driving the rotor 10 rotationally at either one or both of its ends, via the mounting apparatuses, together with one or more motors 3 and respective gearing.

If the rotor 10 comprises multiple rotor portions (not shown in the Figures), the connecting parts between two adjacent rotor portions are mounted and clamped on centre bearer supports located between the mounting apparatuses, as is well known in the art.

A rotor 10 may be provided with a female recessed portion at one end, and a protruding male portion at its other end. Alternatively, a rotor 10 may be provided with two female portions or two male portions. In the embodiments described herein, it is assumed that the rotor 10 is provided with a male and a female portion, and accordingly the mounting apparatuses are provided with respective male and female spline drivers for holding the ends of the rotor (i.e. a male spline driver holds the female end of the rotor 10, and a female spline driver holds the male end of the rotor 10). Other combinations are envisaged. The rotor 10 may be driven from one end, or from both ends, via one or both of the mounting apparatuses. If the rotor 10 is driven from a single end only, the other end of the rotor (i.e. the end not being driven) may comprise a chuck mounted on a spindle, for supporting the rotor 10.

Figure 2:
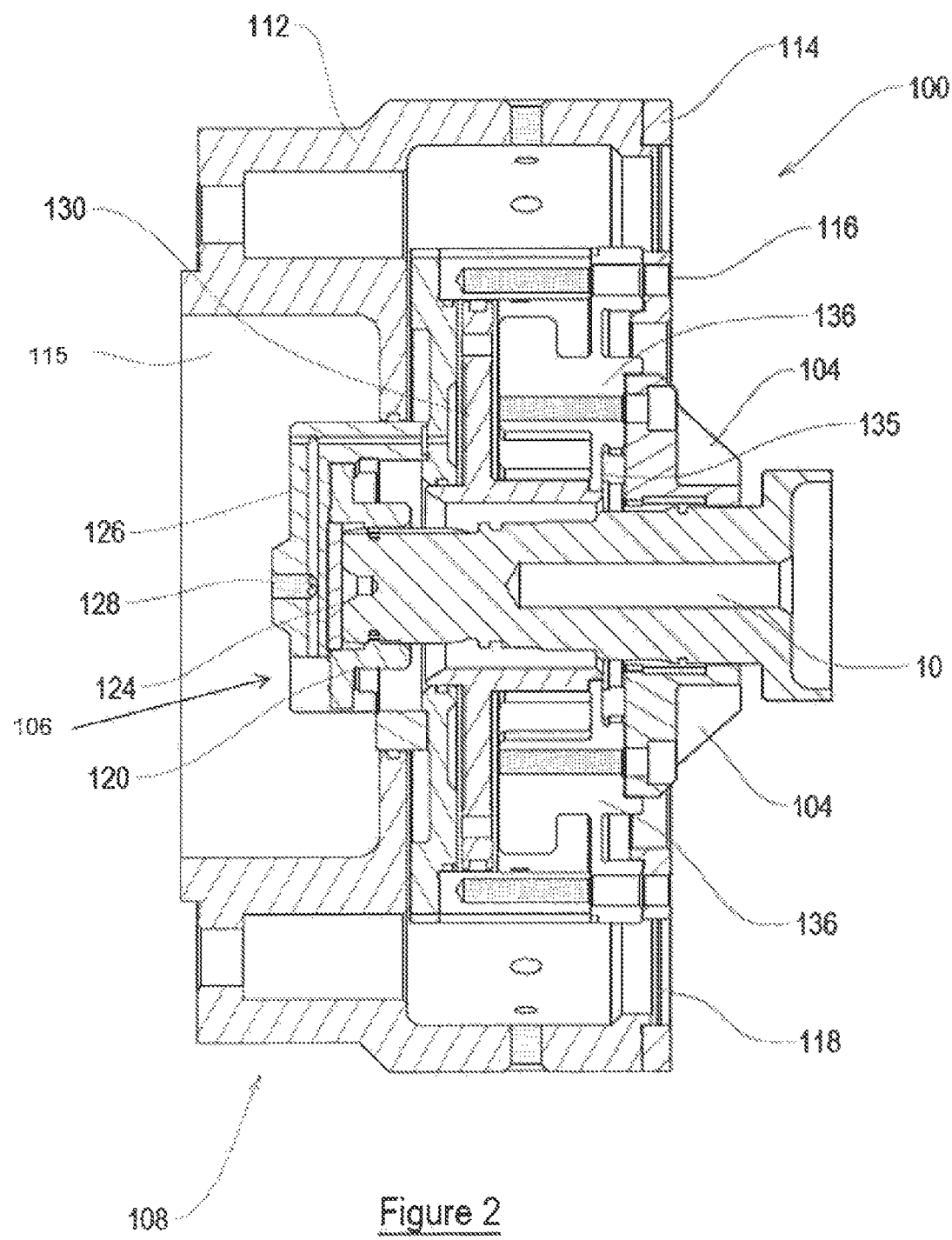
FIGS. 2, 3 and 4 are respective cross-sectional, frontal and perspective views of a mounting apparatus according to an embodiment of the present invention including a female spline driver.
Figure 3:
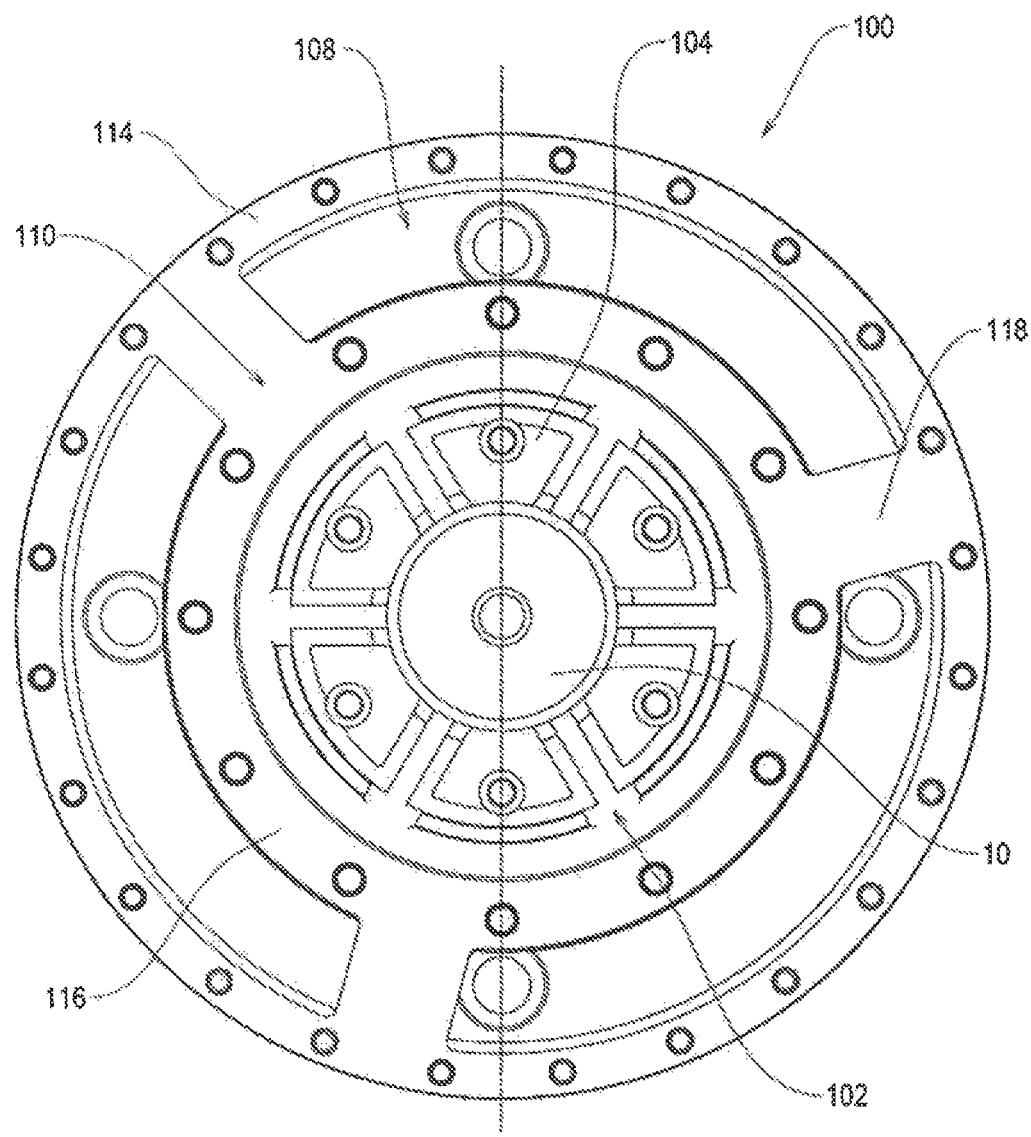
Figure 4:
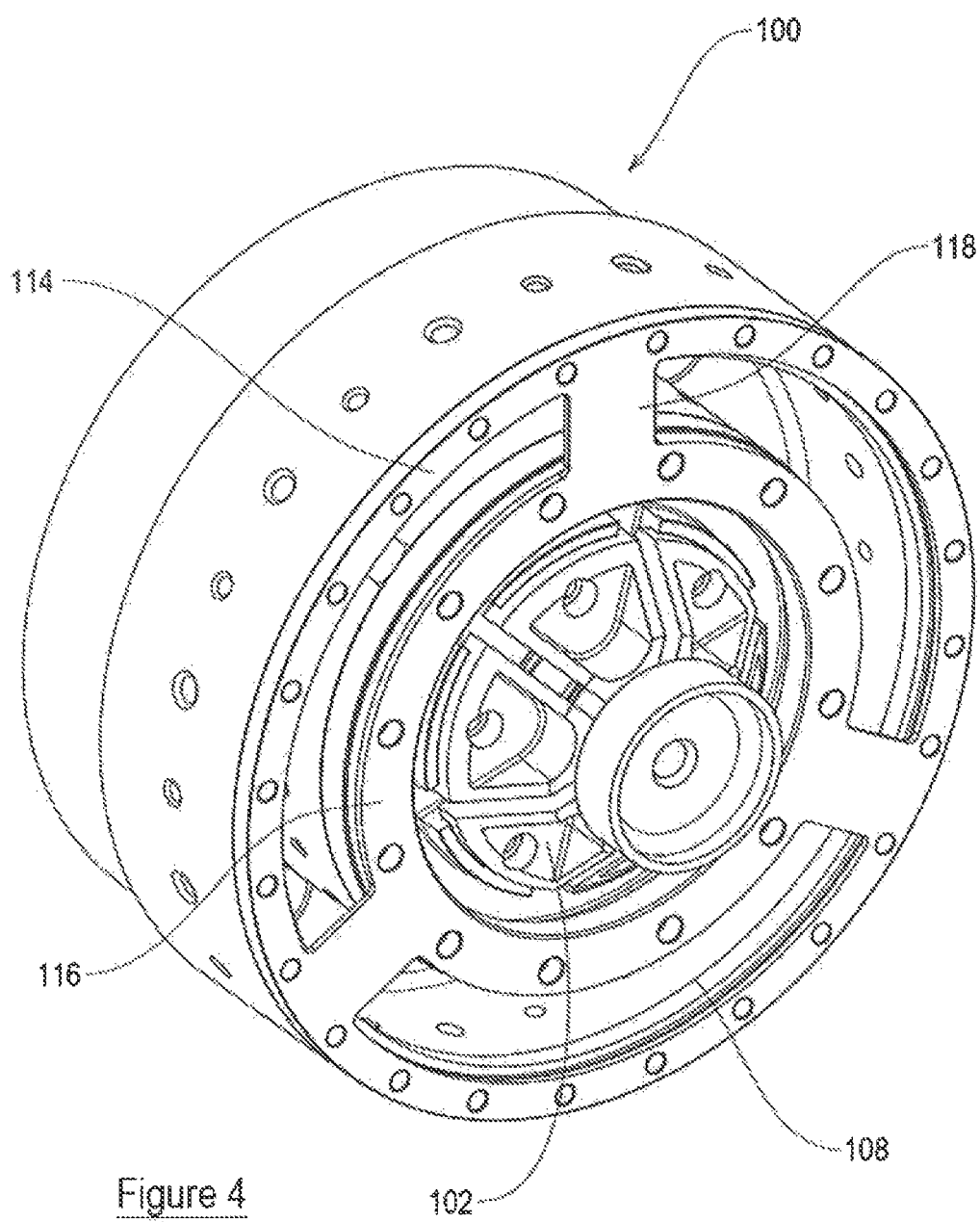

As shown in FIGS. 2, 3 and 4, a mounting apparatus 100 includes a first portion 108 for connection to a driving means (such as a motor 3) for rotation about a first rotational axis, and a second portion 102. The second portion 102 comprises a mounting assembly 102 adapted for engaging with a portion of the rotor 10 so as to hold the rotor 10 relative thereto, configured for rotation about a second rotational axis. It should be understood that the first axis and second axis may be aligned with one another. Such mounting assemblies 102 are commonly referred to as "chucks".

The mounting apparatus 100 also includes a connection member 110 that connects the first portion 108 to the second portion 102. The first portion comprises a drive assembly. The rotational movement of the drive assembly 108 is transferred to the mounting assembly 102 via the connection member 110, the connection member 110 being substantially torsionally rigid so as to transfer the rotational drive effectively. The drive assembly 108 may be driven by known driving means, such as through a driving connection to a spindle driven by a motor 3, for example, or directly by a motor output shaft.

The mounting assembly 102 comprises a plurality of holding formations 104 connected to a deflectable support member 136. Each holding formation 104 provides a surface (which may be a curved surface) for abutting a surface portion of the rotor 10, each holding formation 104 being fastened to the support member 136. An outer periphery of the support member 136 is also fastened to the inner ring 116 of the connection member 110. The connection member 110 is configured substantially to prevent radial movement of the second portion (i.e. the mounting assembly 102) relative to the first portion (i.e. the drive assembly 108), while enabling inclination of the first rotational axis relative to the second rotational axis.

As shown in the Figures, the drive assembly 108 comprises a drum 112 providing a recess to receive the whole or a substantial part of the mounting assembly 102 (at least around the circumference of the mounting assembly 102), and a chamber 1154 provided radially inwardly of the drum 112. In other words, the mounting assembly 102 is substantially housed within the drum 112 of the driving assembly 108. The connection member 110 is disposed across a portion of an open face of the drum 112, spaced from the chamber 115, so as to overlie a portion of the mounting assembly 102.

As shown in FIG. 2, the connection member 110 comprises an outer ring 114 and an inner ring 116 spaced from and concentric with the outer ring 114. The outer ring 114 is connected to the drum 112 of the drive assembly 108 and the inner ring 116 is connected to the mounting assembly 102, by appropriate fasteners. The connections between the connection plate 110 and the mounting assembly 102 and drive assembly 108, respectively, may be provided by bolts spaced around the circumference of each respective ring, for example.

The outer ring 114 and inner ring 116 are connected by a plurality of extension members 118 that extend between the two rings 114, 116. As shown in the Figures, three extension members 118 may be provided. Alternatively, two, four or more extension members 118 may be provided. The extension members 118 are evenly spaced circumferentially from one another around the axis of the connection member 110. The extension members 118 provide radial rigidity so that the spacing between the inner ring 116 and outer ring 114 is maintained during use. In this way, the mounting assembly 102 is held radially with respect to the driving assembly 108. In this position, the axes of the mounting assembly 102 and the drive assembly 108 are aligned with one another and with the axis of a rotor 10 mounted in the apparatus 2.

The spacing between the extension members 118 of the connection member 110 allows a degree of flexibility in the plane of the connection member 110. In other words, the 'face' of the connection member 110 may be distorted slightly so as to form an S-shaped cross-section across its diameter, due to the stresses exerted on the inner ring 116 of the connection member 110. This flexibility allows the connection member 110 to act as a gimbal connection, so that the central axis of the mounting assembly 102 may deviate, e.g. inclined, from its alignment with the central axis of the drive assembly 108. In this manner, the connection member 110 is configured substantially to prevent relative radial movement between the first portion 108 and the second portion 102 of the mounting apparatus 100, but its flexibility enables inclination of the rotational axis of the mounting assembly 102 (i.e. the second axis) relative to the rotational axis of the drive assembly 108 (i.e. the first axis). In particular, the connection member 110 prevents radial movement of the second portion 102 relative to the first portion 108 in the plane in which the rotor 10 is held by the holding formations 104 (which, in the embodiment shown, is substantially the plane of the connection member 110).

By providing an odd number of extension members 118, spaced evenly circumferentially, the connection member 110 is allowed greater flexibility, since no two extension members 118 lie directly opposite one another across a diameter, as that would results in opposed flexibility perpendicular to that diameter. Of course, as mentioned above, an even number of extension members could still be used without departing from the scope of the present invention.

When a rotor 10 is mounted in the apparatus 2 and driven by the drive assembly 108, the rotor 10 may deviate from its desired axis of rotation, due to unbalance in the rotor 10, caused by an uneven axial distribution of its mass at one or more locations along its length. It is this degree of unbalance that is measured by balancing systems. In order to obtain an accurate measurement of any unbalance, the rotor 10 must be held radially securely by the chucks holding each of its ends, but the rotor 10 must be allowed to bend/flex axial.

The configuration of the present invention provides a radially rigid structure that prevents radial movement of the mounting assembly 102 relative to the drive assembly 108. Furthermore, the end portion of the rotor 10 held by the mounting assembly 102 is secured within the holding formations 104 of the chuck without any substantial radial clearance being provided, so that no significant radial movement of the rotor 10 is permitted at the portion being held by the holding formations 104. In embodiments, the holding formations 104 are substantially aligned with the plane of the connection member 10, so that the rotor 10 is held radially in that plane(s).

The flexibility of the connection member 110 allows the rotational axes of the mounting assembly 102 and driving assembly 108 to be inclined relative to one another (in any direction from the axis), thus allowing the rotor 10 held in the holding formations 104 of the mounting assembly 102 to be inclined from its position at rest. In other words, the rotor 10 is permitted to bend/flex when rotating.

The mounting assembly 102 includes an engaging formation 106 adapted to engage an end portion of the rotor 10. The engaging formation 106 is provided by a spline driver 120 adapted to engage the spline 10a, 10b formed at the end portion of the rotor 10. FIG. 2 shows a mounting apparatus that includes a female spline driver 120. The female spline driver 120 provides an inwardly facing circumferential surface for receiving the end of the rotor 10, with the splines extending inwardly from the circumferential surface towards the rotational axis of the mounting assembly 102. The splines 120 are configured for engagement with splines that extend outwardly from the surface of the rotor 10. The spline driver 120 is disposed within a seat 126, the seat providing an end wall to prevent axial movement of the rotor 10 beyond that position. A stop pad 124 is disposed between the end of the rotor 10 and the seat 126, to cushion the rotor 10 and provide a tight fit. The splines provide an improved engagement between the engaging formation 106 and the rotor 10, but they are not essential. The stop pad 124 is also not essential for the invention, but is desirable.

As described above, the mounting assembly 102 includes a plurality of radially spaced holding formations 104, configured to abut a portion of the surface of the rotor 10. In more detail, six holding formations 104 are provided (although more or fewer holding formations may alternatively be provided) at positions spaced evenly circumferentially around the central rotational axis of the mounting assembly 102. The holding formations 104 are supported on a A piston 130 is provided between the holding formations 104 and the engaging formation 106. The piston 130 is configured to receive the portion of the rotor 10 lying between the holding formations 104 and the seat 126 of the engaging formation 106 (although in other embodiments it need not do so).

In embodiments, the mounting assembly 102 further provides an aperture 128 for receiving a source of pressurised air (not shown). The aperture 128 is provided in the seat 126 of the engaging formation 106, which itself is housed with the inner chamber 115 of the drive assembly 102, in or through which a source of pressurised air (e.g. an air cylinder) may be provided. The aperture 128 is in fluid communication with a chamber formed adjacent a surface of the piston 130. A seal is provided around the piston 130 such that increased air pressure within the chamber causes the piston 130 to move axially towards the holding formations 104, such movement causing radial outward movement of the holding formations 104.

Action of the piston 130 causes a central region 135 of the support member 136 to deflect out of plane, which in turn causes the holding formations 104 to disengage from the surface of the rotor 10 (they bow radially outwardly). When the air pressure is removed, the resilience of the support member 136 ensures that the support member 136 re-deflects to it generally planar condition, pushing the piston 130 back, and, as a result, causes the holding formations 104 to engage the surface of the rotor 10. In the art, this is often referred to as a diaphragm chuck.

Figure 5:
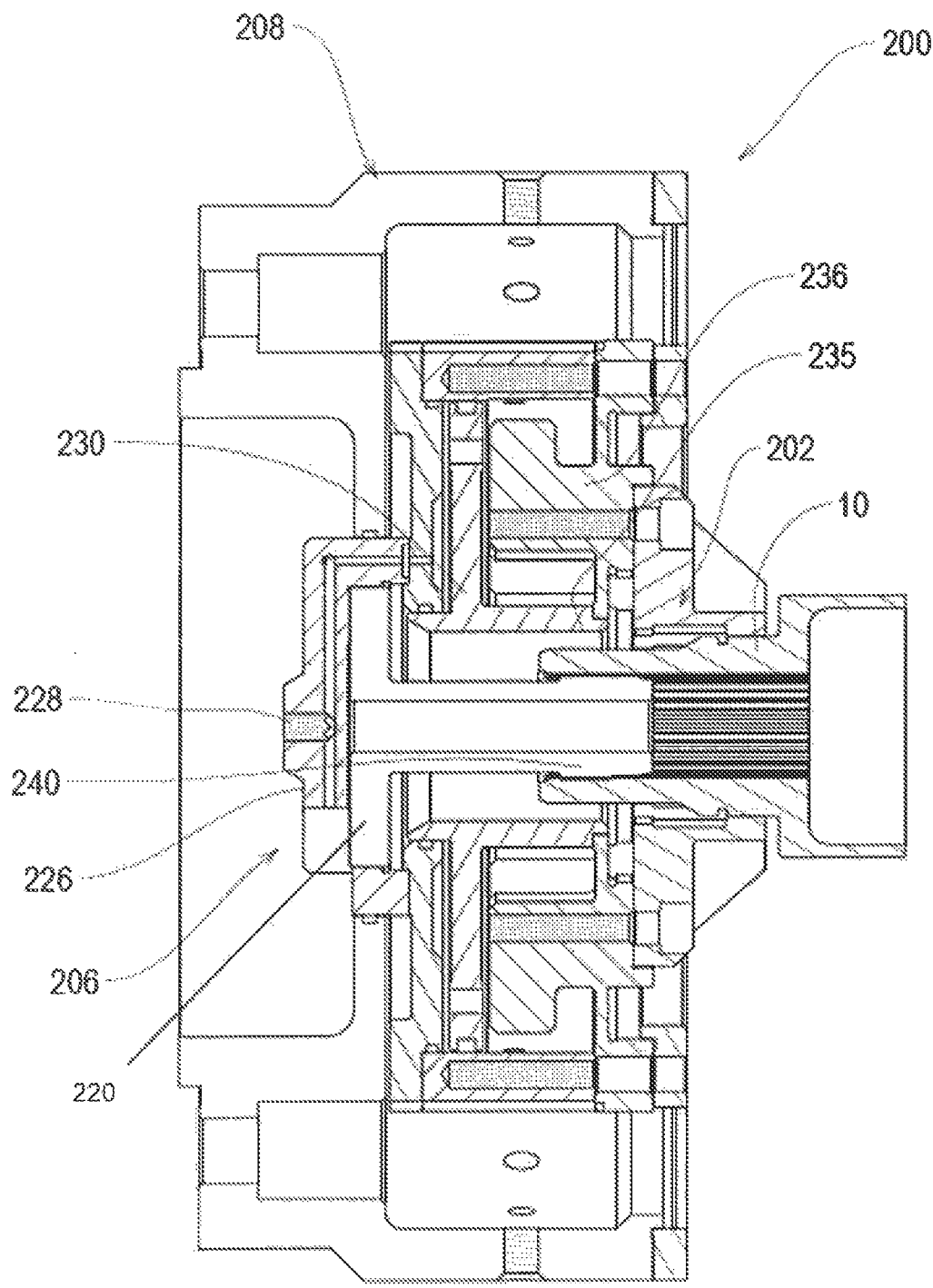
FIGS. 5, 6 and 7 are respective cross-sectional, frontal and perspective views of a mounting apparatus according to an embodiment of the present invention including a male spline driver.
Figure 6:
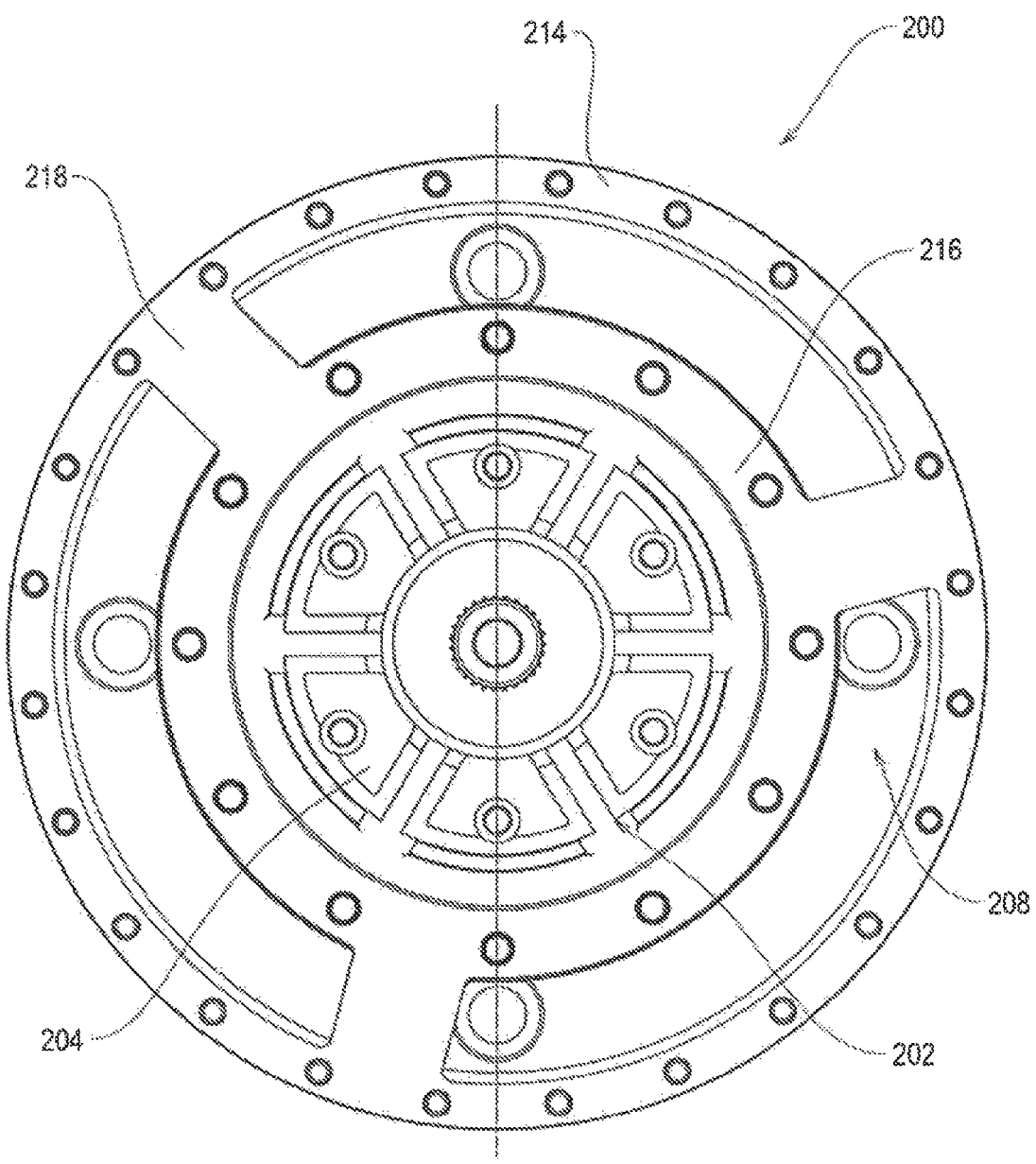
Figure 7:
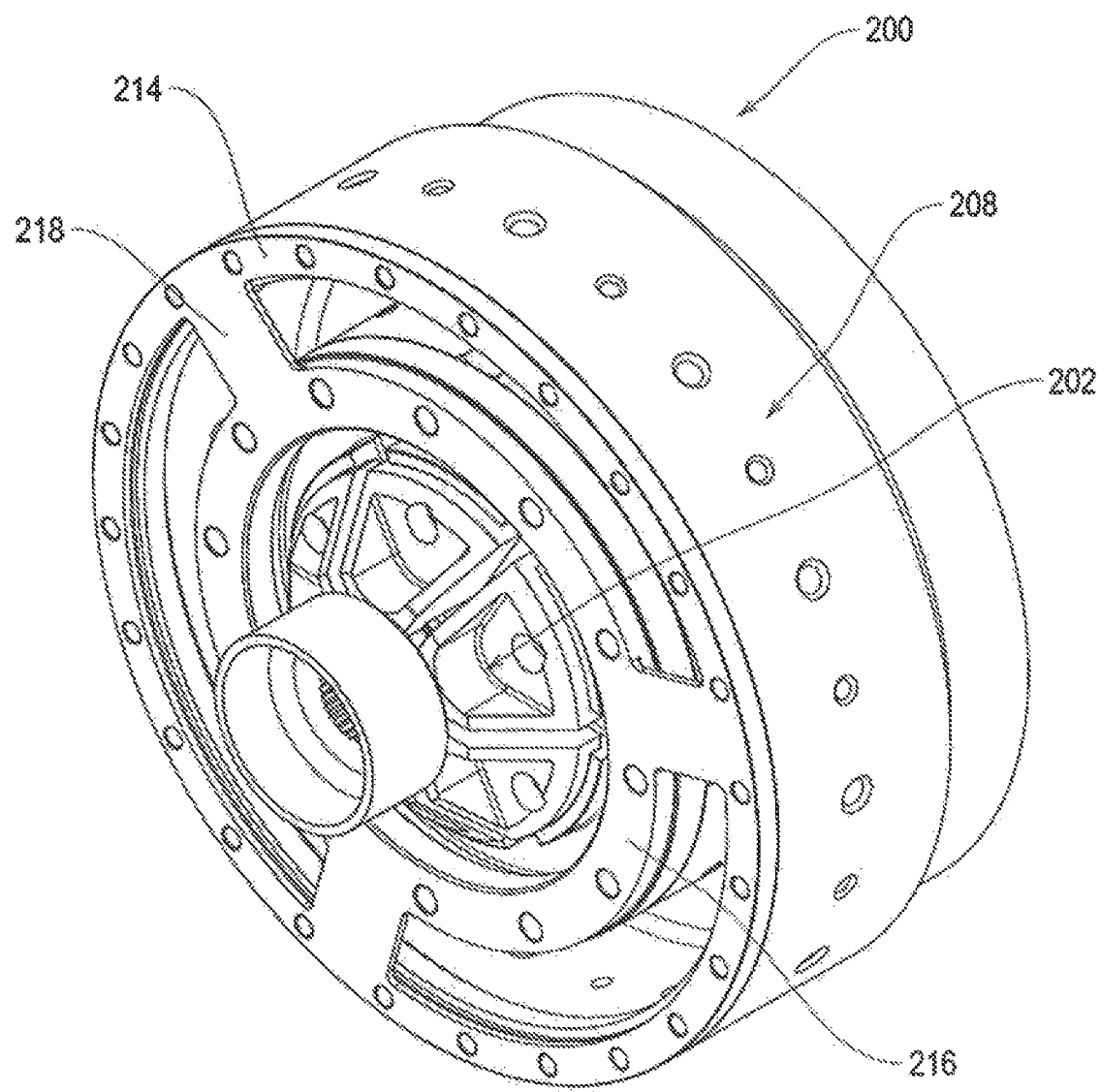
Figure 8:
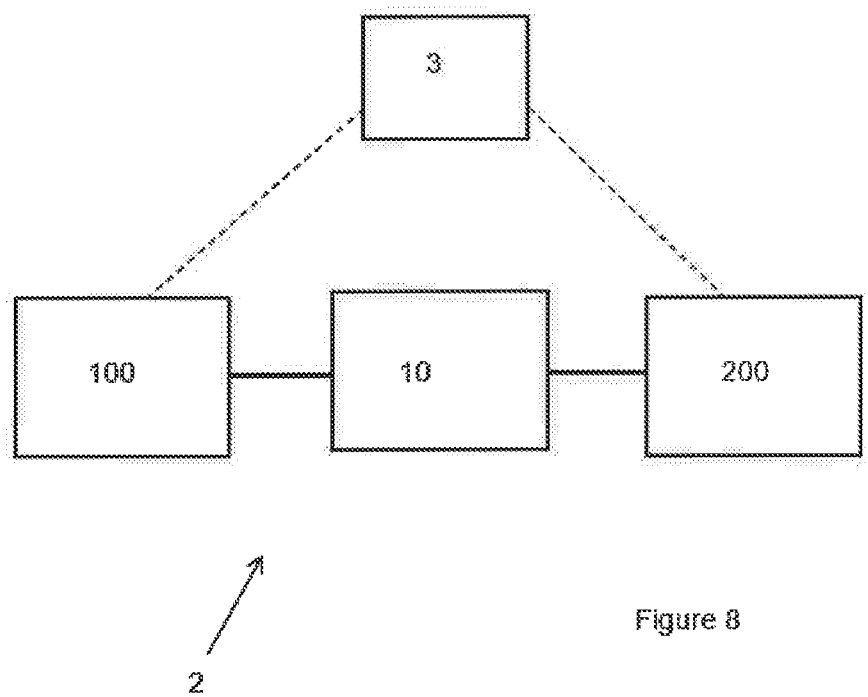
FIGS. 8 and 9 illustrate an apparatus and a balancing machine, respectively.
Figure 9:
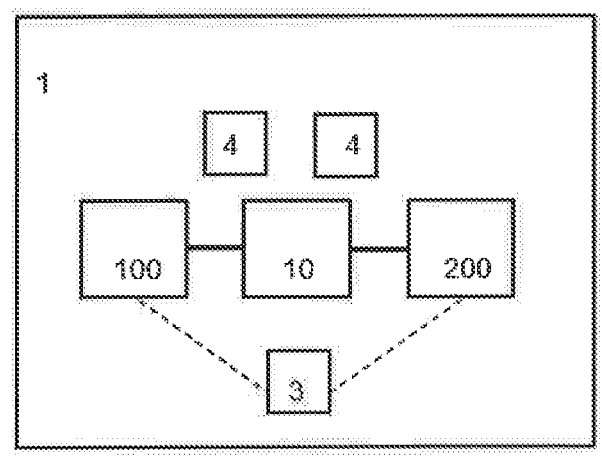

As shown in FIGS. 5 to 7 of the drawings, a mounting apparatus 200 may be provided that is adapted to receive a female spline portion of the end of a rotor 10, the mounting assembly 202 being provided with a male spline driver 220. All aspects of the mounting apparatus 200 are identical to the mounting apparatus 100 described above, with the exception of the engaging formation 206. Reference numerals used in FIGS. 5 to 7 that relate to corresponding parts described in relation to FIGS. 2 to 4 will be indicated by numerals 100 greater than the corresponding numerals where used in those figures. For example, the holding formations of the chuck are labelled with 104 in FIGS. 2 to 4, and 204 in FIGS. 5 to 7.

Engaging formation 206 comprises a male spline driver 220 having a base portion supported within a seat 226, and an engaging portion 240 extending from the base portion so as to engage a respective female recess provided in the end portion of a rotor 10. The engaging portion 240 provides splines extending radially outwardly which are configured to engage with splines defined within walls of the recess provided within the rotor 10.

The apparatus 2 for driving a rotor 10, comprising two such mounting apparatuses 100, 200, may form part of a balancing machine 1. The balancing machine 1 includes a plurality of measuring devices 4 disposed at positions between the first and the second mounting apparatuses for measuring unbalance in a rotor mounted in the machine 1. The mechanism for correcting unbalance may be automated, by which balance weights are welded or otherwise attached to the rotor 10 at a set position along the axis of the rotor for each plane in which the unbalance is measured, within specified balance zones. As an example method only, once weights for all planes (where required) are applied to the rotor, the rotor unbalance is measured again using the same method. If the unbalance measured in any plane remains outside of a predefined tolerance threshold, a second step of correction is carried out within the corresponding balance zone.

It should be appreciated that a balancing machine 1 could include either or both of the apparatuses shown in the figures. Alternatively still, a balancing machine 1 could be provided with two of the apparatuses shown in FIGS. 2 to 4 or two of the apparatuses shown in FIG. 5 to 7. This will depend on the configuration of the end portions of the rotor to be balanced.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A mounting apparatus for a rotor, including:
   a first portion for connection to a driving means, for rotation about a first rotational axis;
   a second portion comprising a mounting assembly adapted for engaging with a portion of the rotor so as to hold the rotor relative thereto, configured for rotation about a second rotational axis; and
   a connection member connecting the first portion to the second portion so that rotational movement of the first portion effects rotational movement of the second portion about the second rotational axis,
   wherein the connection member is configured substantially to prevent radial movement of the second portion relative to the first portion, while enabling inclination of the first rotational axis relative to the second rotational axis.

2. A mounting apparatus according to claim 1, wherein the first portion is a drive assembly configured for connection to a motor for providing rotation about the first rotational axis.

3. A mounting apparatus according to claim 1, wherein the connection member is positioned in a plane which extends substantially perpendicularly to the first rotational axis.

4. A mounting apparatus according to claim 1, wherein the connection member is disposed in a plane which extends substantially radially away from the first and/or second rotational axes.

5. A mounting apparatus according to claim 1, wherein the connection member is radially rigid.

6. A mounting apparatus according to claim 1, wherein the connection member is torsionally rigid.

7. A mounting apparatus according to claim 1, wherein the connection member comprises an outer ring and an inner ring spaced from and concentric with the outer ring, the outer ring being connected to the first portion and the inner ring being connected to the second portion, the outer ring and inner ring being connected by a plurality of extension members.

8. A mounting apparatus according to claim 7, wherein the extension members are spaced evenly circumferentially from one another about an axis of the connection member.

9. A mounting apparatus according to claim 1, wherein the mounting assembly includes an engaging formation adapted to engage and hold rotationally fast thereto an end portion of the rotor.

10. A mounting apparatus according to claim 9, wherein the engaging formation is provided by a splined recess adapted to engage one or more splines formed on the end portion of the rotor.

11. A mounting apparatus according to claim 10 wherein the engaging formation is a male formation for engaging a recessed female formation provided in or on the end of the rotor.

12. A mounting apparatus according to claim 10 wherein the engaging formation is a female formation for receiving a male formation provided at or on the end of the rotor.

13. A mounting apparatus according to claim 1, wherein the mounting assembly includes a plurality of circumferentially spaced radially moveable holding formations, each configured to abut a portion of a surface of the rotor.

14. A mounting apparatus according to claim 1, wherein the second portion includes a recess to receive the whole or a substantial part of the mounting assembly.

15. An apparatus for driving a rotor, including a first and a second mounting apparatus each according to claim 1, for receiving respective first and second opposite ends of a rotor, and at least one motor connected for driving one or both of the first and second mounting apparatuses.

16. A balancing machine including an apparatus according to claim 15, further including a plurality of measuring devices disposed at positions between the first and the second mounting apparatuses for measuring unbalance in a rotor mounted in the machine.

* * * * *